(12) United States Patent
Tran et al.

(10) Patent No.: US 7,526,406 B2
(45) Date of Patent: Apr. 28, 2009

(54) ROOT MEDIAN SQUARE POWER MEASUREMENT

(75) Inventors: Phat Tran, Waterloo (CA); Xing Qian, Waterloo (CA); Sean Simmons, Waterloo (CA); Jonathan Swoboda, Alvinston (CA)

(73) Assignee: Research In Motion Limited, Waterloo, ON ( * ) Notice: Subject to any disclaimer, the term of this patent is extended or adjusted under 35 U.S.C. 154(b) by 56 days.

(21) Appl. No.: 11/702,668

(22) Filed: Feb. 6, 2007

(65) Prior Publication Data
US 2008/0186011 A1    Aug. 7, 2008

(51) Int. Cl.
*G06F 17/18* (2006.01)
(52) U.S. Cl. .................................................. 702/179
(58) Field of Classification Search ................. 702/179, 702/182; 711/147, 153; 707/2, 3
See application file for complete search history.

(56) References Cited
U.S. PATENT DOCUMENTS 6,694,419 B1 * 2/2004 Schnee et al. ............... 711/173
6,794,881 B1   9/2004 Reichel
7,130,838 B2 * 10/2006 Barsness et al. ................ 707/2

FOREIGN PATENT DOCUMENTS
EP    1367844 A    12/2003

* cited by examiner

Primary Examiner—Bryan Bui
(74) Attorney, Agent, or Firm—Heenan Blaikie LLP

(57) ABSTRACT

A method of estimating an electrical characteristic of an electrical signal involves allocating measurements amongst numerically sequential primary partitions. Each measurement is associated with a characteristic of an electrical signal. Each primary partition has a respective primary numerical range, and the value of each measurement is numerically within one of the primary numerical ranges. The measurements associated with one of the primary partitions are then allocated amongst numerically sequential secondary partitions. One of the measurements that is associated with the one primary partition has a desired rank. The secondary partitions are disposed numerically within the primary numerical range of the one primary partition. Each secondary partition has a respective secondary numerical range, and the value of each measurement that is associated with each secondary partition is within one of the secondary numerical ranges. The characteristic is estimated by selecting one of the secondary partitions in accordance with the desired rank.

21 Claims, 12 Drawing Sheets

ROOT MEDIAN SQUARE POWER MEASUREMENT

FIELD OF THE INVENTION

The invention described herein relates to a method for estimating the power of an electrical signal. In particular, this invention relates to a method for calculating a root-median-square power measurement of an electrical signal.

BACKGROUND OF THE INVENTION

Typically, the magnitude and power measurements of an electrical signal are expressed in terms of RMS (Root Mean Square) values since the algorithms for implementing such measurements are computationally inexpensive and analytically well understood. However, RMS measurements are sensitive to the distribution of values in the input data set, in particular, large-magnitude outliers. As a result, RMS measurements are strongly affected by spectral coloration and contamination.

In the context of wireless networking, this means that RMS Received Signal Strength Indications (RSSI) are skewed by channel filter shape, channel interference and noise. Root Median Square (RMedS) measurements are known to be less sensitive to outliers than RMS measurements. However, the algorithms for implementing RMedS measurements tend to be computationally expensive. Due to the limited computational power of a wireless mobile station, it is impractical to calculate the RSSI of a wireless signal at a mobile station using a conventional RMedS algorithm.

As a result, there remains a need for a method of estimating an electrical characteristic (e.g. voltage magnitude, current magnitude, or power) of an electrical signal that may be subjected to spectral coloration and contamination. There also remains a need for a method of estimating the RSSI of a wireless signal at a mobile station.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
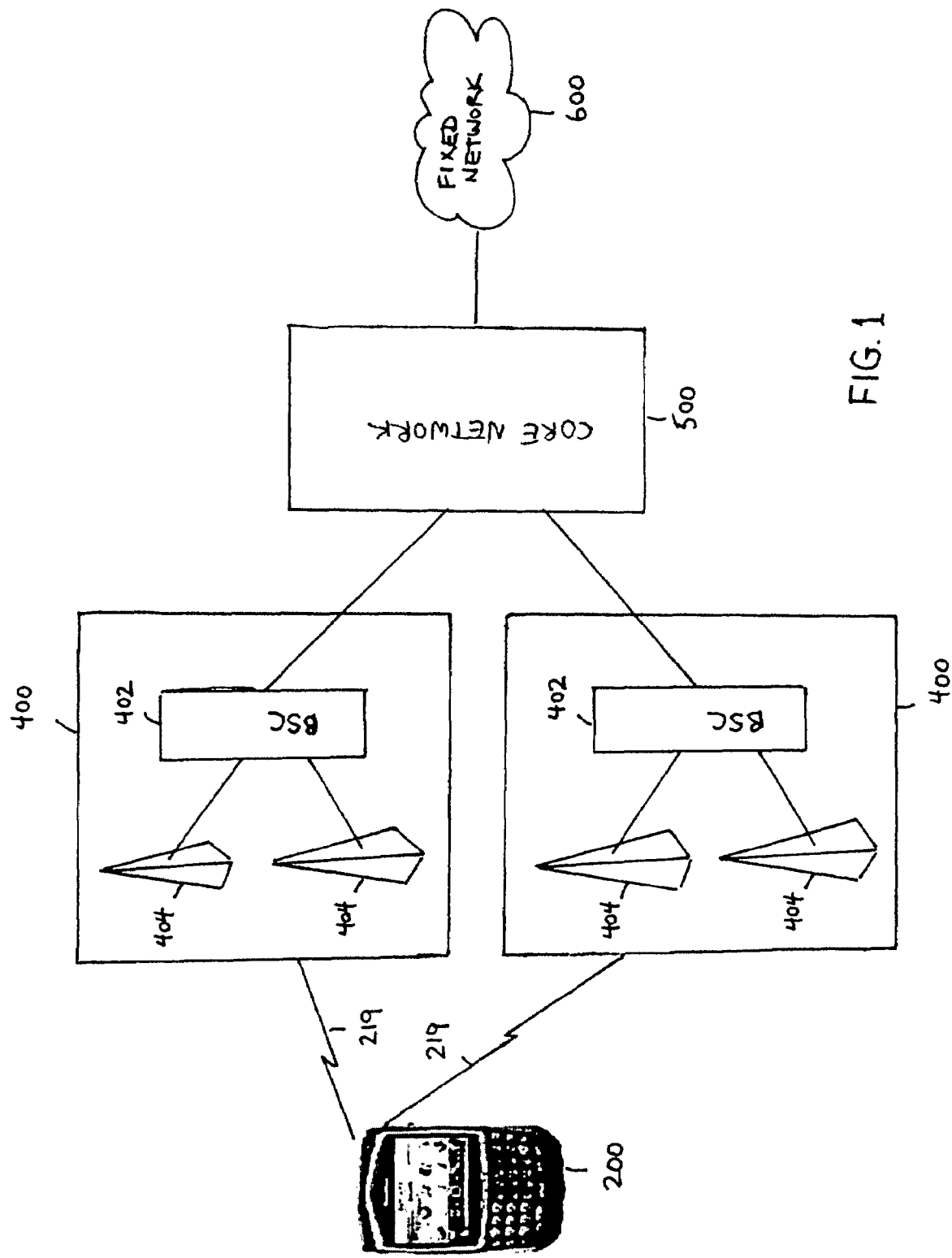
FIG. 1 is a schematic diagram depicting a mobile communications network, including he handheld communications device according to the invention.

The invention described herein comprises an iterative median algorithm for estimating the median value from a data set.

In accordance with a first aspect of the invention, there is provided a method of estimating an electrical characteristic of an electrical signal. The method, according to this first aspect of the invention, begins by allocating a plurality of measurements amongst numerically sequential primary partitions. Each measurement is associated with a characteristic of an electrical signal. Each primary partition has a respective primary numerical range, and the value of each measurement is numerically within one of the primary numerical ranges.

The measurements associated with one of the primary partitions are then allocated amongst numerically sequential secondary partitions. One of the measurements that is associated with the one primary partition has a desired rank. The secondary partitions are disposed numerically within the primary numerical range of the one primary partition. Each secondary partition has a respective secondary numerical range, and the value of each measurement that is associated with a secondary partition is within the respective secondary numerical range.

One of the secondary partitions is then selected in accordance with the desired rank. One of the measurements that is associated with the selected secondary partition has the desired rank.

In accordance with a second aspect of the invention, there is provided a wireless communications device that is configured to estimate an electrical characteristic of an electrical signal. The wireless communications device, according to this second aspect of tie invention, comprises primary allocation means, secondary allocation means coupled to the primary allocation means, and selecting means coupled to the secondary allocation means.

The primary allocation means is configured to allocate a plurality of measurements amongst numerically sequential primary partitions. Each measurement is associated with a characteristic of an electrical signal received at the communications device. Each primary partition has a respective primary numerical range, and a value of each measurement is numerically within one of the primary numerical ranges.

The secondary allocation means is configured to allocate the measurements associated with one of the primary partitions amongst numerically sequential secondary partitions. One of the measurements that is associated with the one primary partition has a desired rank. The secondary partitions are disposed numerically within the primary numerical range of the one primary partition. Each secondary partition has a respective secondary numerical range, and the value of each measurement that is associated with a secondary partition is within the respective secondary numerical range.

The selecting means is configured to select one of the secondary partitions in accordance with the desired rank. One of the measurements that is associated with the selected secondary partition has the desired rank.

In accordance with a third aspect of the invention, there is provided a computer readable medium that carries processing instructions for an electronic communications device. The processing instructions, when executed by a computer processor of the communications device, enables the device to estimate an electrical characteristic of an electrical signal.

The method, according to this third aspect of the invention, begins by allocating a plurality of measurements amongst numerically sequential primary partitions. Each measurement is associated with a characteristic of an electrical signal that is received at the communications device. Each primary partition has a respective primary numerical range, and a value of each measurement is numerically within one of the primary numerical ranges.

The measurements that are associated with one of the primary partitions are then allocated amongst numerically sequential secondary partitions. One of the measurements that is associated with the one primary partition has a desired rank. The secondary partitions are disposed numerically within the primary numerical range of the one primary partition. Each secondary partition has a respective secondary numerical range, and the value of each measurement that is associated with a secondary partition is within the respective secondary numerical range.

One of the secondary partitions is then selected in accordance with the desired rank. One of the measurements that is associated with the selected secondary partition has the desired rank.

In a preferred implementation of the invention, each measurement comprises a set of binary digits having a word length. Each primary partition comprises a unique primary set of binary digits of primary length less than the word length. Each unique primary set of binary digits is uniquely associated with a primary counter, and the measurements are allocated amongst the primary partitions by, for each measurement, incrementing the primary counter that corresponds to the set of most significant binary digits of the measurement.

Similarly, each secondary partition comprises a unique secondary set of binary digits of secondary length. Each secondary set of binary digits is uniquely associated with a secondary counter, and the measurements are allocated amongst the secondary partitions by, for each measurement that is associated with the one primary partition, incrementing the secondary counter that corresponds to the set of next most significant binary digits of the measurement.

Preferably, the measurements are allocated amongst the secondary partitions by clipping, the measurements that are associated with the primary partitions, other than the one primary partition, to the upper and lower limits of the primary numerical range of the one primary partition. Typically, the clipping step involves (1) for the measurements whose values are greater than the upper limit, mapping the set of next most significant binary digits to the maximum secondary partition; and (2) for the measurements whose values are less than the lower limit, mapping the set of next most significant binary digits to the minimum secondary partition.

Further, prior to allocating the measurements amongst the primary partitions, preferably the values of the measurements are scaled such that the maximum value of the measurements coincides with the maximum primary partition.

Preferably, the measurements comprise a times-series of square amplitudes of the electrical signal, and the estimate of the electrical characteristic comprises the RSSI of the electrical signal, which is expressed as the square root of the combined value of the primary set of binary digits of the one primary partition and the secondary set of binary digits of the selected one secondary partition.

In accordance with a fourth aspect of the invention, there is provided a method of controlling an industrial process using an interactive rank evaluation algorithm. The method, according to this fourth aspect of the invention, begins by allocating a plurality of data values amongst numerically sequential primary partitions. Each data value is associated with a process parameter of an industrial process. Each primary partition has a respective primary numerical range, and each data value is numerically within one of the primary numerical ranges.

The data values associated with one of the primary partitions are then allocated amongst numerically sequential secondary partitions. One of the data values that is associated with the one primary partition has a desired rank. The secondary partitions are disposed numerically within the primary numerical range of the one primary partition. Each secondary partition has a respective secondary numerical range, and each data value that is associated with a secondary partition is within the respective secondary numerical range.

The industrial process is then controlled by selecting one of the secondary partitions in accordance with the desired rank. One of the data values that is associated with the selected secondary partition has the desired rank.

In accordance with a fifth aspect of the invention, there is provided a method of estimating a characteristic of an electrical signal in a handheld computing device. The method, according to this fifth aspect of the invention, involves, while receiving, in real-time, a plurality of measurements of the characteristic of the electrical signal, at the handheld computing device repeatedly allocating the measurements amongst a hierarchical multi-level partition space until a desired resolution of the measurement associated with a desired rank is attained. Each level of the partition space has a plurality of partitions. Each partition has a respective numerical range. One of the partitions in each partition level encompasses the numerical range of all the partitions in the partition level immediately lower thereto. The value of each allocated measurement is within a respective one of the numerical ranges. The numerical range of one of the partitions comprises the desired rank resolution.

Turning now to FIG. 1, a mobile communications network, denoted generally as 100, is shown in communication with a fixed network 600, and comprises at least one handheld communications device 200, a plurality of base station subsystems (BSSs) 400, and a core network 500. Preferably, the communications network 100 is configured as a GSM network. However, the invention is not limited to GSM networks.

The handheld communications devices 200 communicate with the BSSs 400 via a wireless cellular network 219. Since the root-mean-square value and the root-median-square value of a signal differ when the amplitude of the signal varies, preferably the handheld communications devices 200 and the BSSs 400 communicate over the wireless cellular network 219 using constant amplitude, phase-modulated wireless signals. Accordingly, preferably the handheld communications devices 200 and the BSSs 400 communicate using GMSK. However, the handheld communications devices 200 and the BSSs 400 may communicate using other phase-modulated wireless signals which have a strong mode, such as 8PSK.

The BSSs 400 provide a bridge between the wireless cellular network 219 and the core network 500, and communicate with the core network 500 via a wired or optical link. As shown, each BSS 400 includes a Base Station Controller (BSC) 402 and a plurality of Base Transceiver Stations (BTSs) 404. The BTSs 404 implement radio link protocols with the handheld communications device 200. Each BTS 404 includes one or more radio transceivers, the coverage area of which comprises a radio system cell. Further, each BTS 404 is connected to the BSC 402 via a wired or optical link. The BSC 402 acts as a physical connection between the handheld communications device 200 and the core network 500.

Preferably, the core network 500 facilitates digital communication between the handheld communications devices 200 and the fixed network 600. Preferably, the core network 500 implements data (e.g. GPRS/EDGE) and/or telephony communications protocols.

The core network 500 communicates with the fixed network 600 via a wired or optical link, and acts as switching node to the fixed network 600. Typically, the fixed network 600 comprises a Public Switched Telephone Network (PSTN) or an Integrated Services Digital Network (ISDN).

Figure 2:
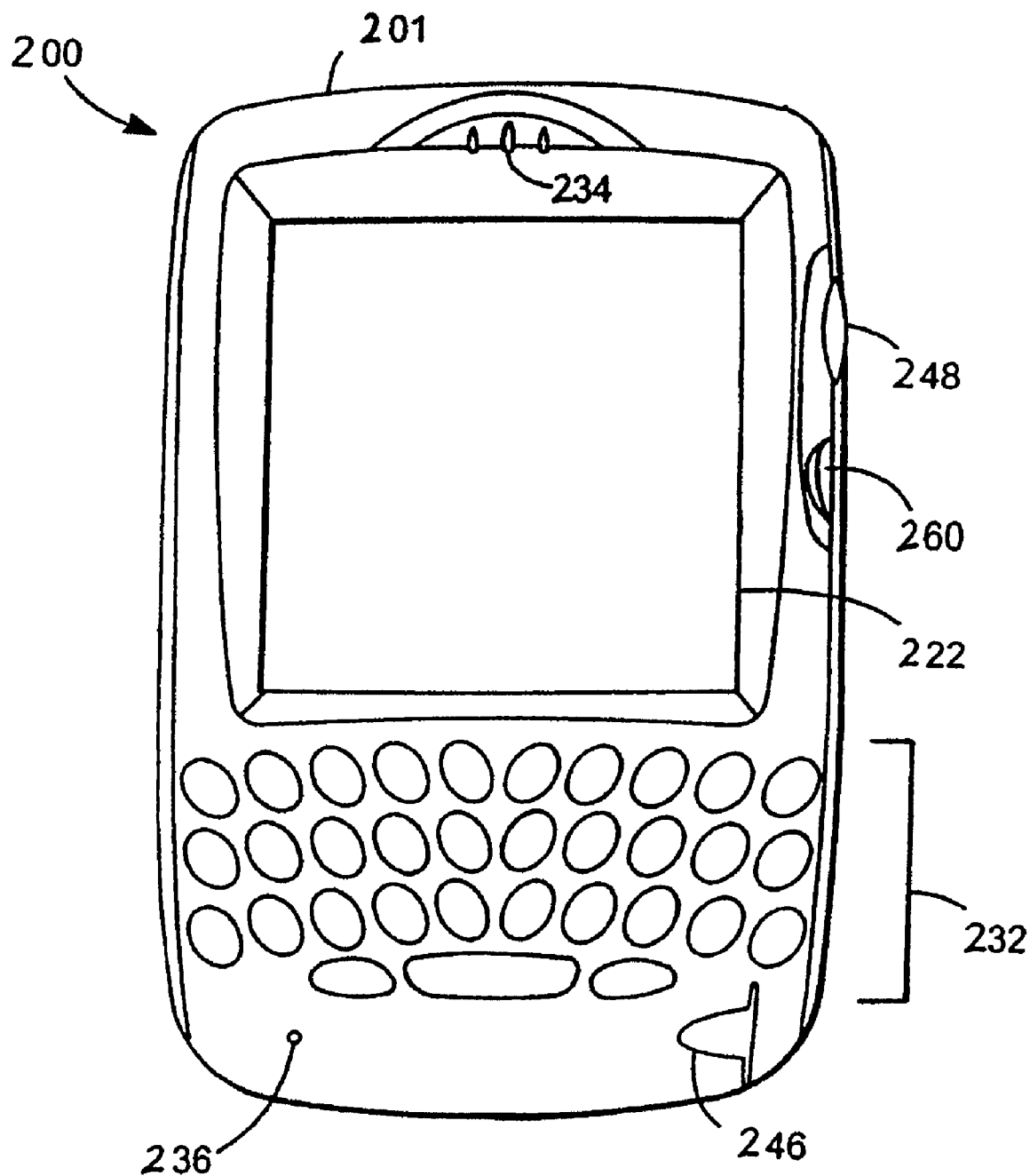
FIG. 2 is a front plan view of the handheld communications device depicted in FIG. 1.

Referring now to FIG. 2, there is shown a sample handheld communications device 200 in accordance with the invention. Preferably, the handheld communications device 200 is a two-way wireless communications device having at least voice and data communication capabilities, and is configured to operate within a wireless cellular network. Further, preferably the handheld communications device 200 has the capability to communicate with other computer systems on the Internet. Depending on the exact functionality provided, the wireless handheld communications device 200 may be referred to as a data messaging device, a two-way pager, a wireless e-mail device, a cellular telephone with data messaging capabilities, a wireless Internet appliance, or a data communication device, as examples.

As shown, the handheld communications device 200 includes a display 222, a function key 246, and data processing means 202 (not shown) disposed within a common housing 201. The display 222 comprises a backlit LCD display. The data processing means 202 is in communication with the display 222 and the function key 246. In one implementation, the backlit display 222 comprises a transmissive LCD display, and the function key 246 operates as a power on/off switch. Alternately, in another implementation, the backlit display 222 comprises a reflective or trans-reflective LCD display, and the function key 246 operates as a backlight switch.

In addition to the display 222 and the function key 246, the handheld communications device 200 includes user data input means for inputting data to the data processing means 202. As shown, preferably the user data input means includes a keyboard 232, a thumbwheel 248 and an escape key 260.

Figure 3:
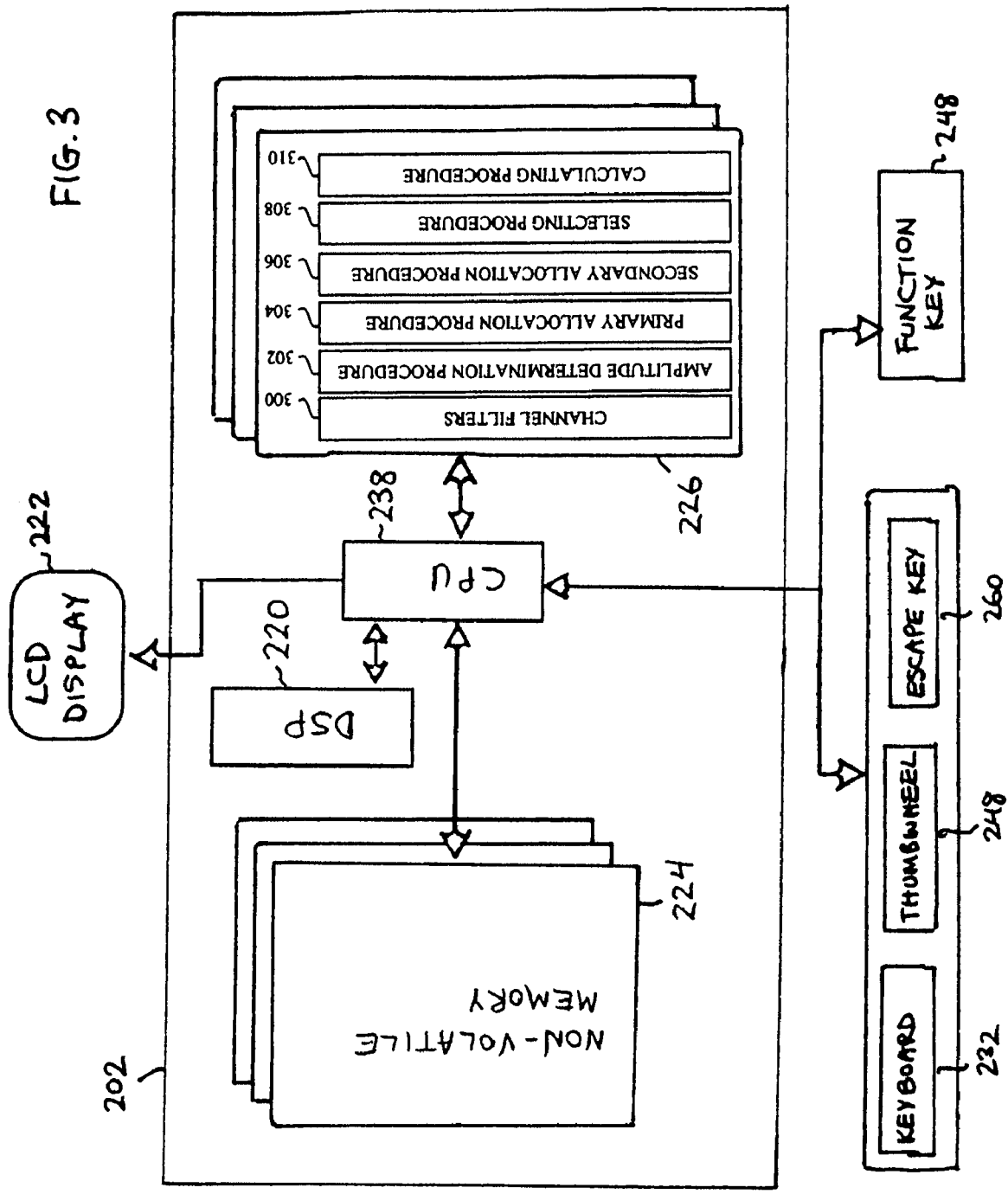
FIG. 3 is a schematic diagram depicting certain functional details of the data processing means of the handheld communications device, including the primary allocation procedure, the secondary allocation procedure, the selecting procedure, and the calculating procedure.

As shown in FIG. 3, the data processing means 202 comprises a digital signal processor (DSP) 220 and a microprocessor 238 in communication with flash memory 224 and volatile memory (RAM) 226. The flash memory 224 includes computer processing instructions which, when copied into the memory 226 and executed by the microprocessor 238, implement an operating system, computer programs, and operating system specific applications. The operating system includes an Open Systems Interconnection (OSI) communication protocol stack that allows the handheld communications device 200 to send and receive communication signals over the wireless cellular network 219.

The flash memory 224 also includes computer processing instructions which, when copied into the RAM 226 and executed by the DSP 220, implement one or more channel filters 300, an amplitude determination procedure 302, a primary allocation procedure 304, a secondary allocation procedure 306, a selecting procedure 308, and a calculating procedure 310. The function of the channel filters 300, the amplitude determination procedure 302, the primary allocation procedure 304, the secondary allocation procedure 306, the selecting procedure 308, and the calculating procedure 310 will be discussed in greater detail below. However, it is sufficient at this point to note that the amplitude determination procedure 302, the primary allocation procedure 304, the secondary allocation procedure 306, the selecting procedure 308 and the calculating procedure 310 together comprise a method that provides an estimate of an electrical characteristic of an electrical signal.

Typically, the handheld communications device 200 uses the electrical signal characteristic estimate to select and/or re-select radio system cells in the wireless cellular network 219. However, the invention is not so limited. It should also be understood that although the channel filters 300, the amplitude determination procedure 302, the primary allocation procedure 304, the secondary allocation procedure 306, the selecting procedure 308, and the calculating procedure 310 are preferably implemented as a set of computer processing instructions, these procedures may be implemented in electronics hardware instead.

Figure 4:
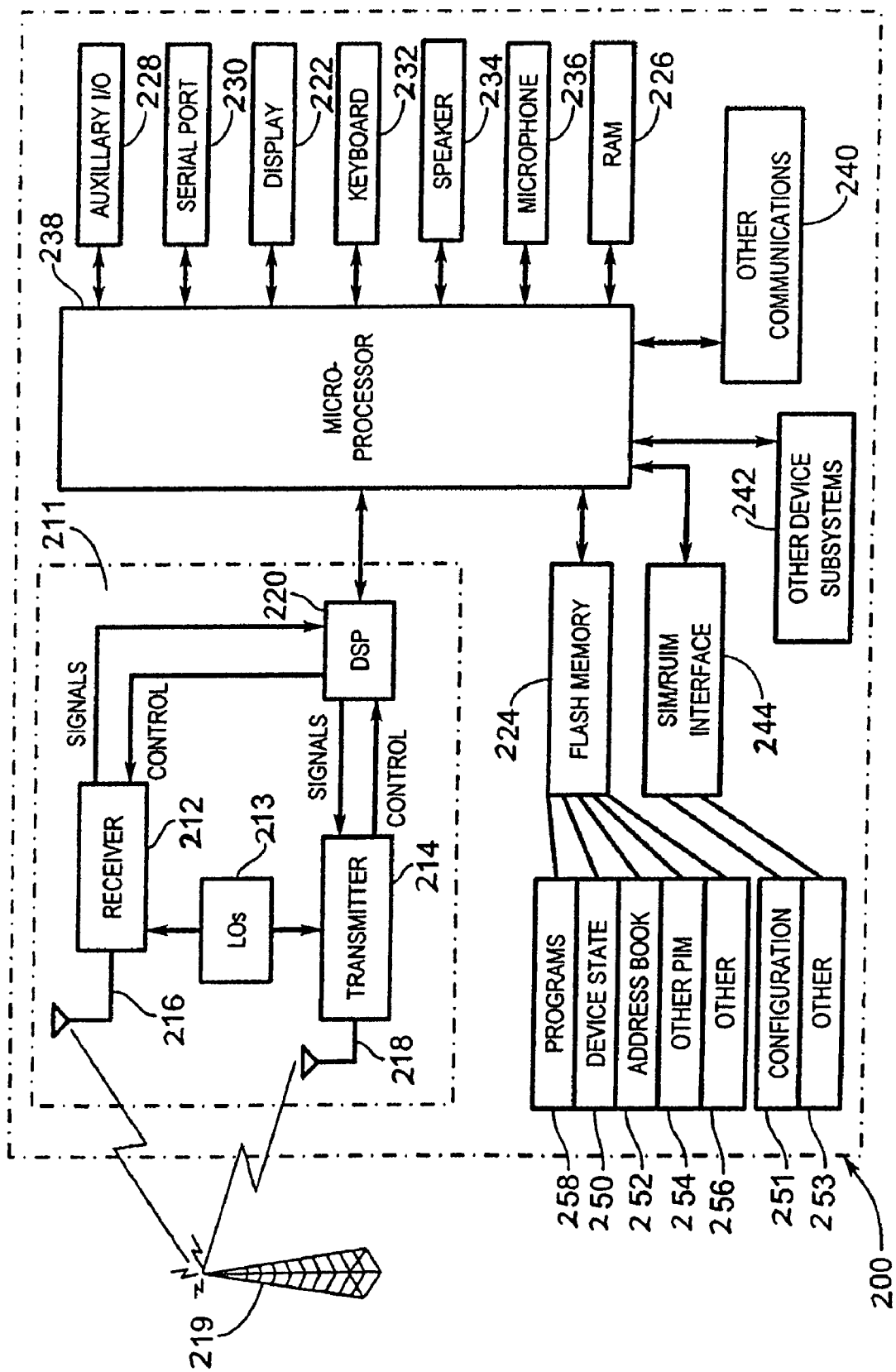
FIG. 4 is a schematic diagram depicting certain additional functional details of the handheld communications device.

FIG. 4 depicts functional details of the handheld communications device 200. As shown, the handheld communications device 200 incorporates a motherboard that includes a communication subsystem 211, the microprocessor 238, and a SIM/RUIM interface 244. The communication subsystem 211 performs communication functions, such as data and voice communications, and includes a receiver 212, a transmitter 214, and associated components such as one or more embedded or internal, antenna elements 216 and 218, local oscillators (LOs) 213, and the digital signal processor (DSP) 220. The communication subsystem 211 allows the handheld communications device 200 to send and receive communication signals over the wireless cellular network 219.

Signals received by antenna 216 through the wireless network 219 are input to the receiver 212, which performs common receiver functions such as frequency down conversion, and analog to digital (A/D) conversion, in preparation for more complex communication functions performed by the DSP 220. In a similar manner, signals to be transmitted are processed by the DSP 220 and input to transmitter 214 for digital to analog conversion, frequency up conversion, and transmission over the wireless network 219 via antenna 218.

The DSP 220 implements the aforementioned channel filters 300 through which communication signals are received from the receiver 212 and transmitted to the transmitter 214. The DSP 220 also implements the amplitude determination procedure 302, the primary allocation procedure 304, the secondary allocation procedure 306, the selecting procedure 308 and the calculating procedure 310.

The SIM/RUIM interface 244 is similar to a card-slot into which a SIM/RUIM card can be inserted and ejected like a diskette or PCMCIA card. The SIM/RUIM card holds many key configuration 251, and other information 253 such as identification, and subscriber related information.

The microprocessor 238 controls the overall operation of the device, interacting with device subsystems such as the display 222, flash memory 224, RAM 226, auxiliary input/output (I/O) subsystems 228, serial port 230, keyboard 232, speaker 234, microphone 236, short-range communications subsystem 240, and device subsystems 242. As shown, the flash memory 224 includes both computer program storage 258 and program data storage 250, 252, 254 and 256.

Computer processing instructions are preferably also stored in the flash memory 224 or other similar non-volatile storage. Other computer processing instructions may also be loaded into a volatile memory such as RAM 226. The computer processing instructions, when accessed from the RAM 226 and executed by the microprocessor 238 define the operating system, computer programs, operating system specific applications. Such computer processing instructions may be installed onto the handheld communications device 200 upon manufacture, or may be loaded through the wireless network 219, the auxiliary I/O subsystem 228, the serial port 230, the short-range communications subsystem 240, or device subsystem 242.

In a data communication mode, a received text message or web page download will be processed by the communication subsystem 211 and output to the display 222, or alternatively to an auxiliary I/O device 228. A user of the handheld communications device 200 may compose data items such as email messages for example, using the keyboard 232. Such composed items may then be transmitted over the wireless network 219 through the communication subsystem 211.

For voice communications, overall operation of the handheld communications device 200 is similar, except that received signals would preferably be output to the speaker 234 and signals for transmission would be generated by a microphone 236. Further, the display 222 may provide an indication of the identity of a calling party, the duration of a voice call, or other voice call related information for example.

Figure 5:
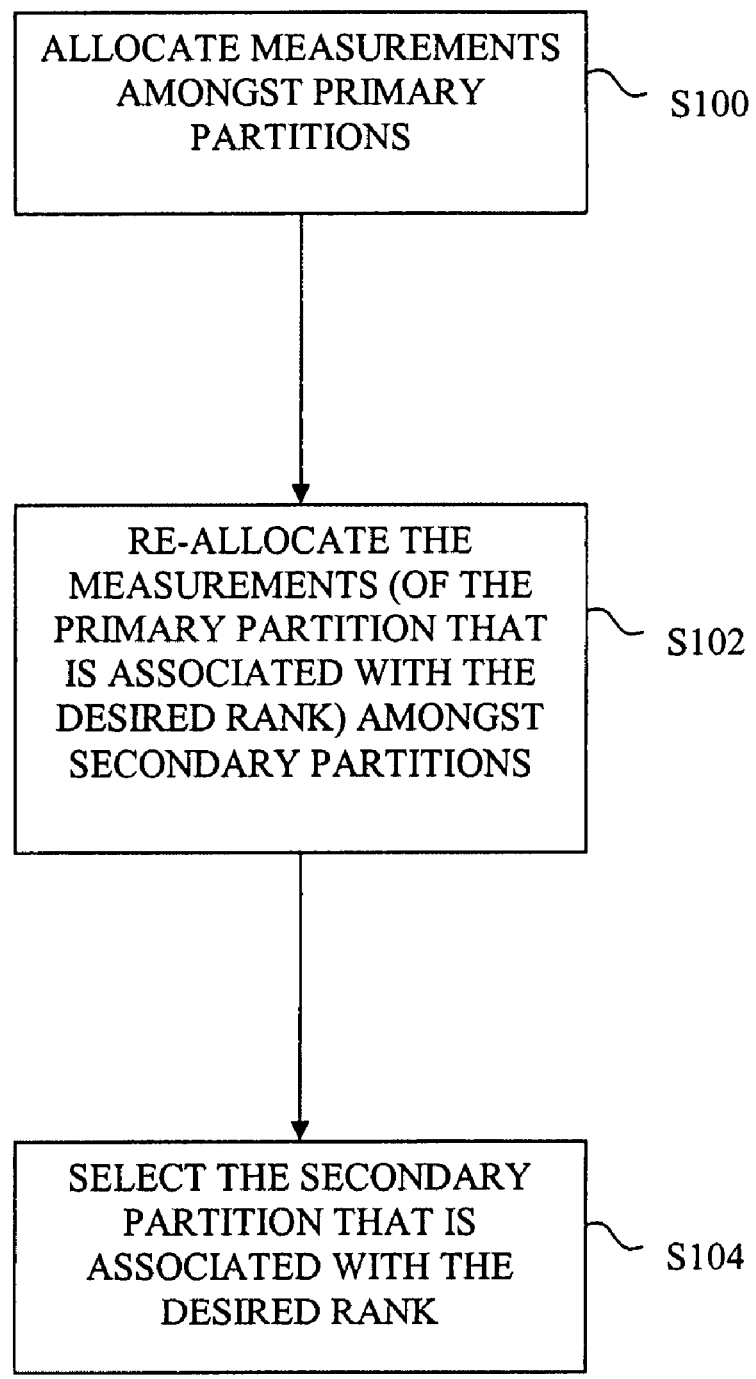
FIG. 5 is a flow chart depicting, by way of overview, the method performed by the handheld communications device when estimating a characteristic of an electrical signal.
Figure 6:
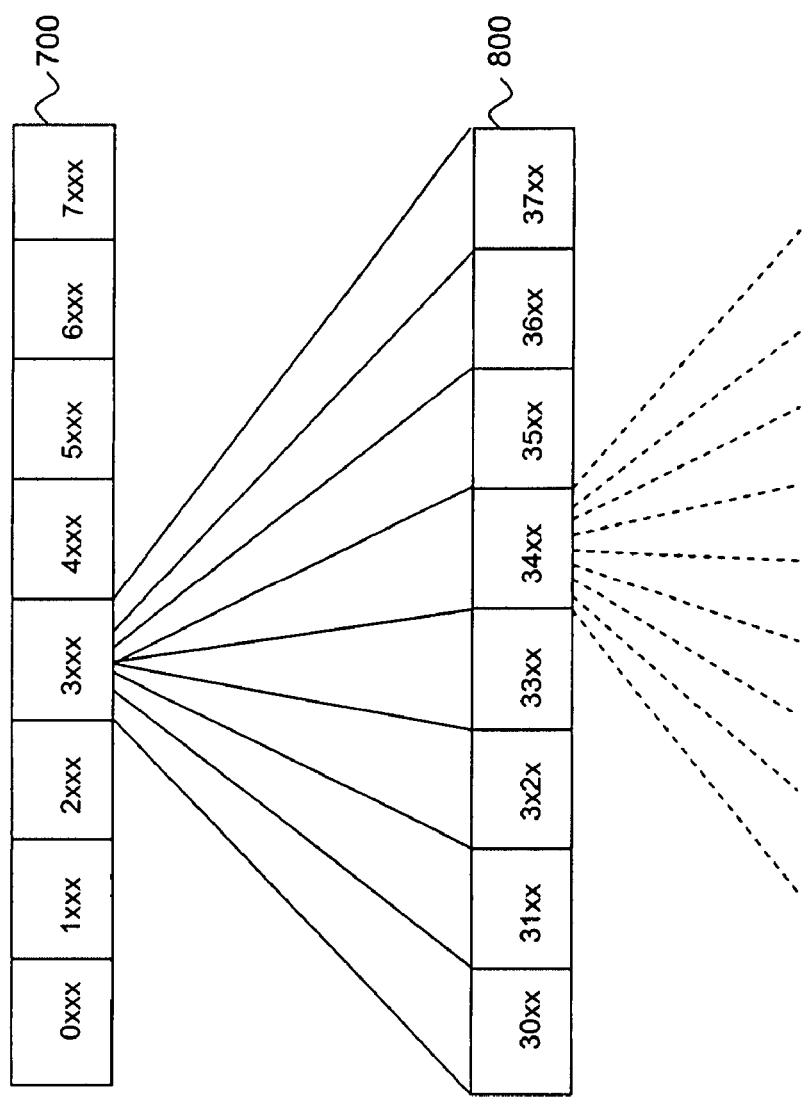
FIG. 6 is a schematic diagram depicting a sample set of primary and secondary partitions, as contemplated by the method.
Figure 7A:
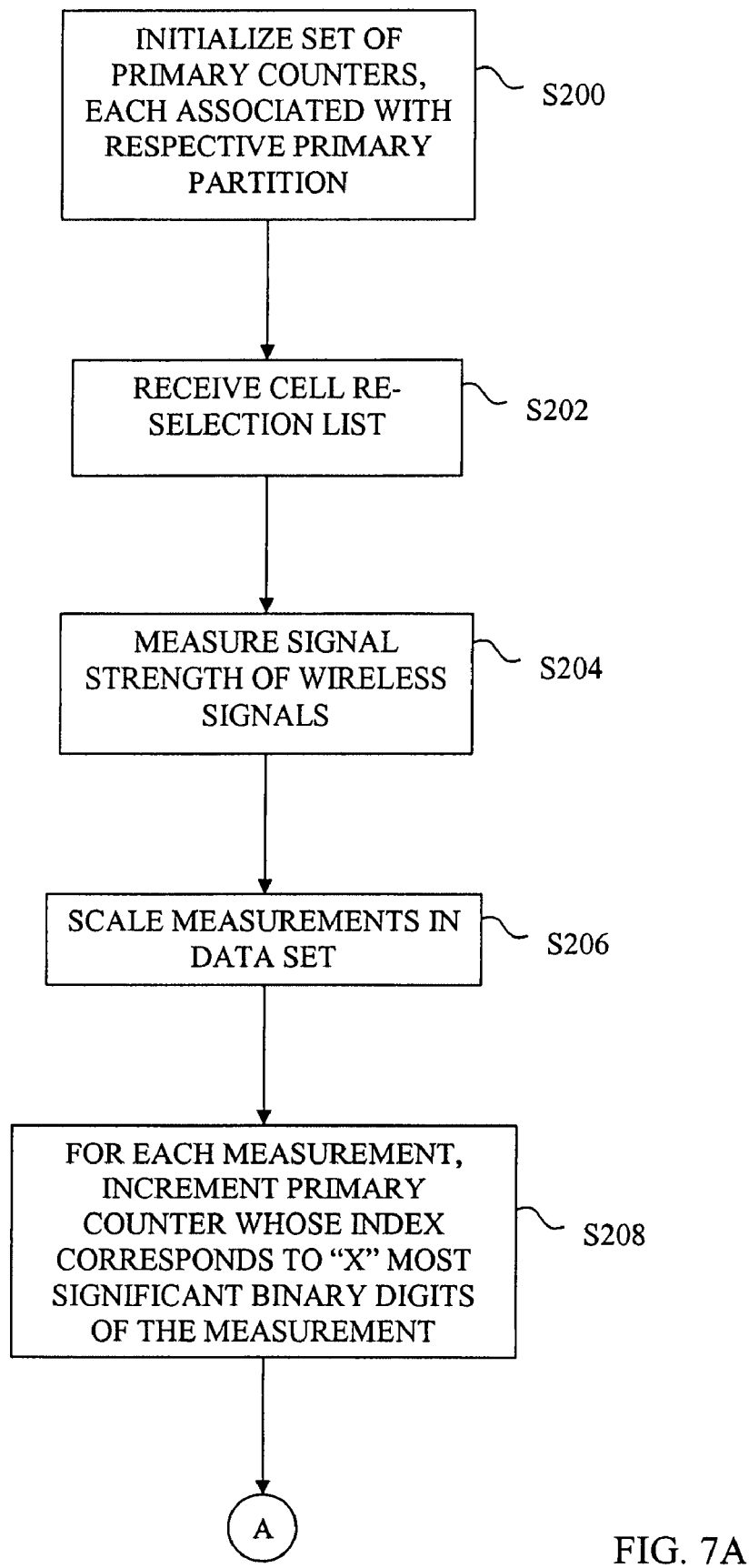
FIG. 7 (comprising FIGS. 7a to 7e) is a flow chart depicting, in detail, the method performed by the handheld communications device when measuring received signal strength.
Figure 7B:
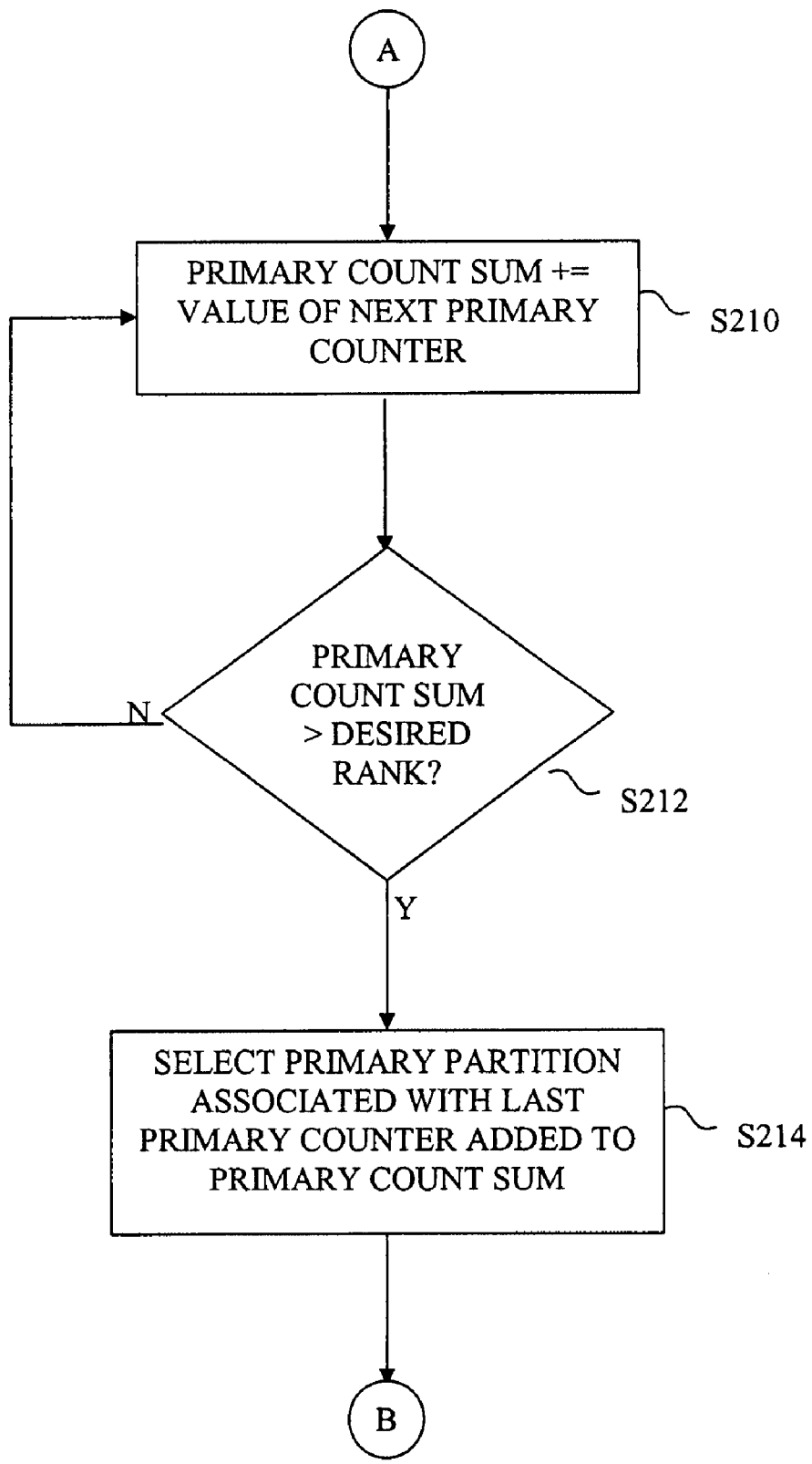
Figure 7C:
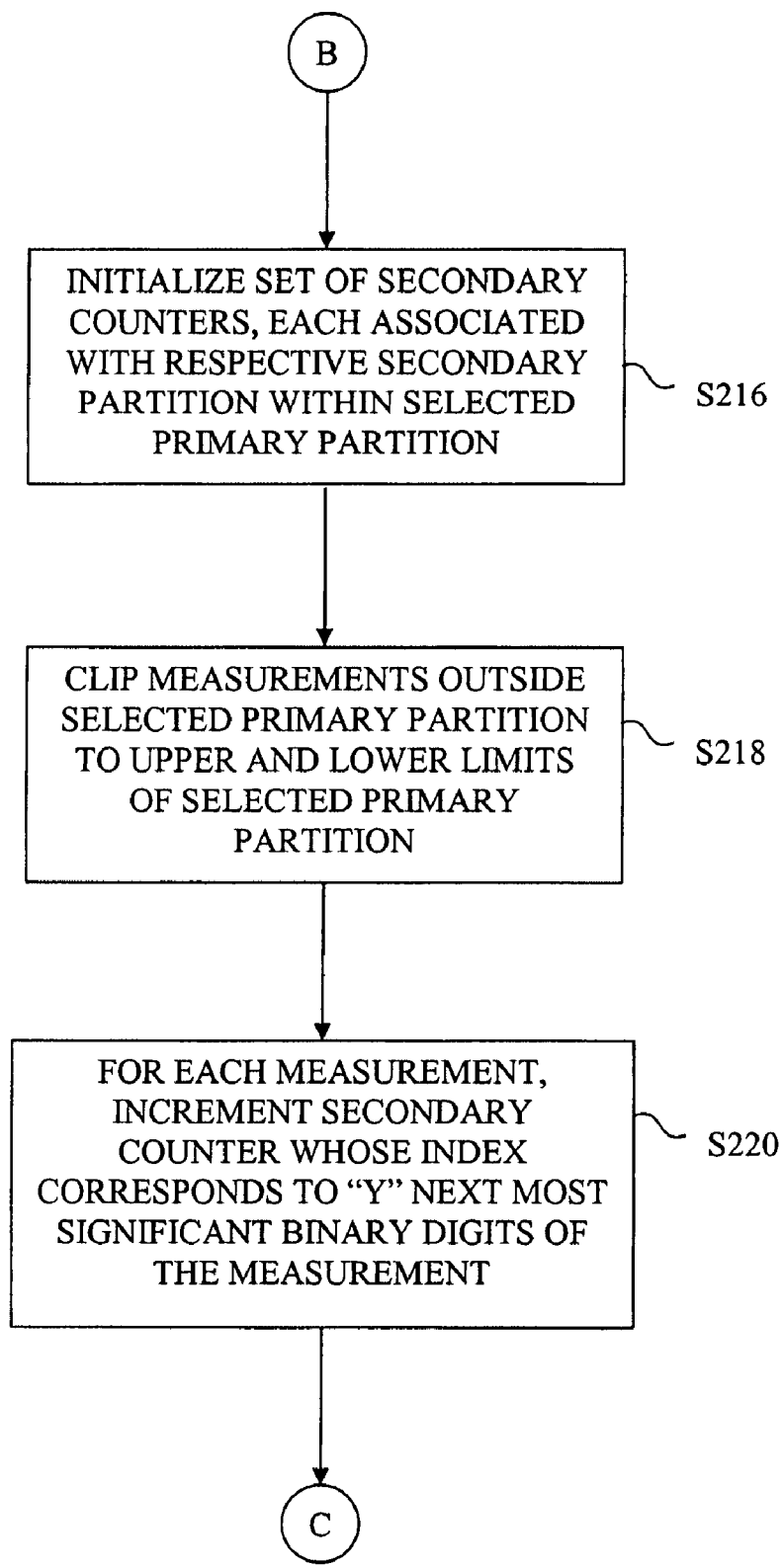
Figure 7D:
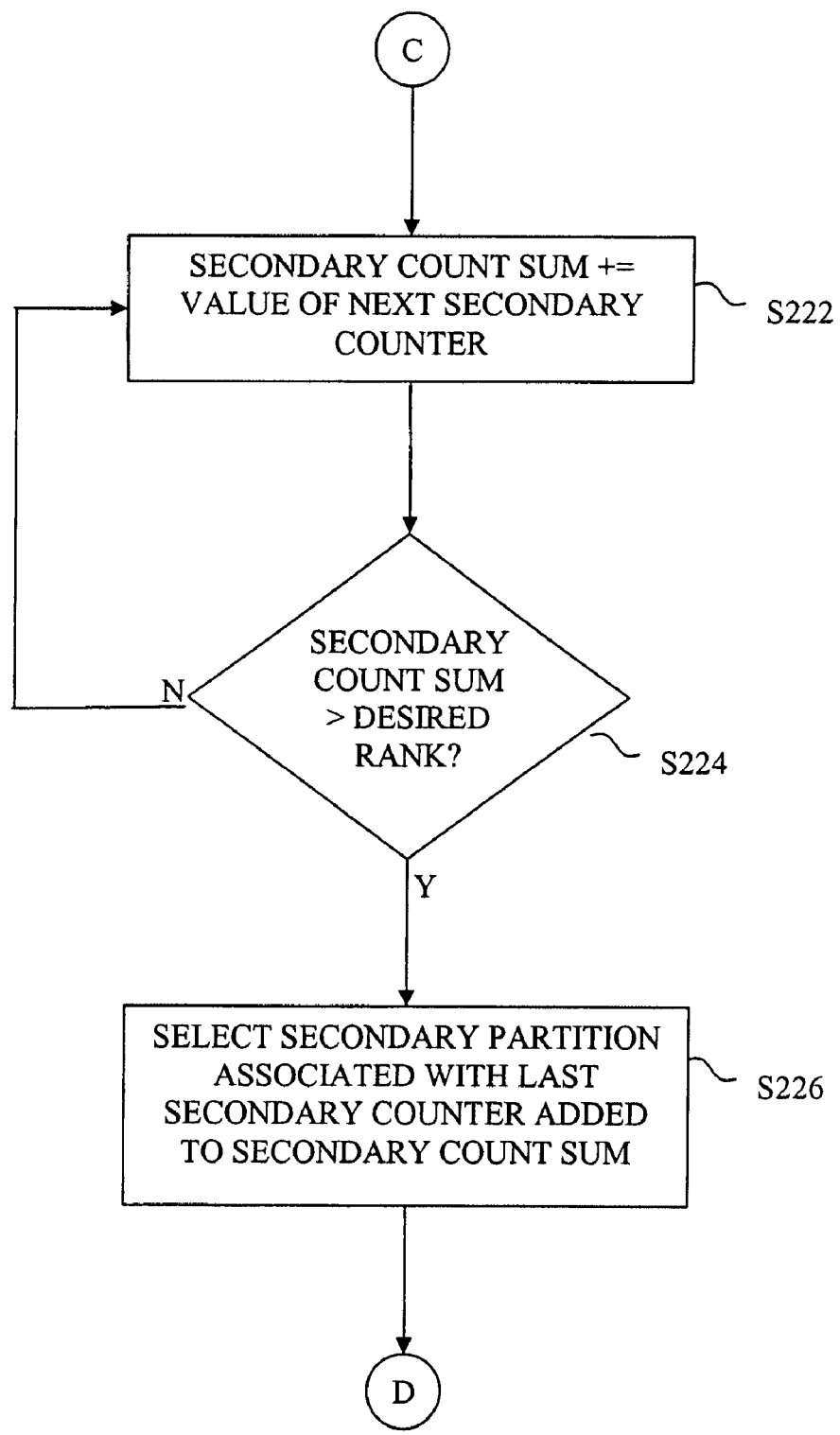
Figure 7E:
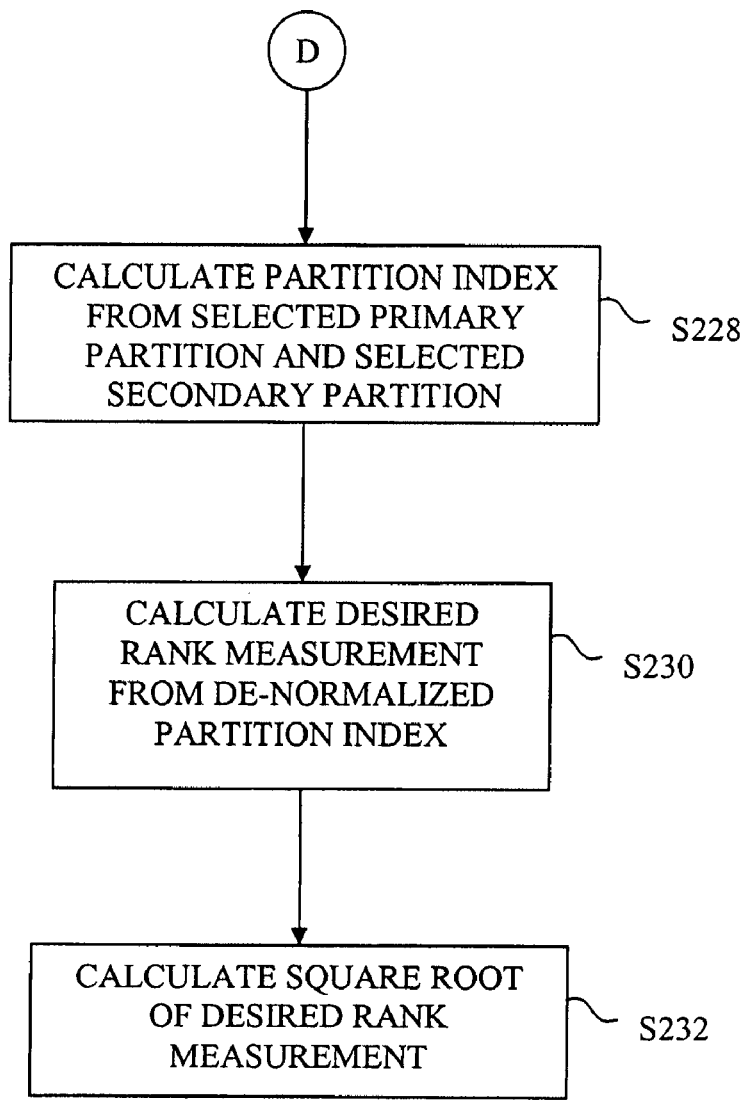

FIG. 5 is a flow chart that depicts, by way of overview, the method implemented in the handheld communications device 200 for estimating an electrical characteristic of an electrical signal. At step S100, the primary allocation procedure 302 of the handheld communications device 200 allocates a plurality of measurements amongst numerically sequential primary partitions. Each measurement is associated with a characteristic of an electrical signal. Each primary partition has a respective primary numerical range, and the value of each measurement is numerically within one of the primary numerical ranges. A set of eight sample primary partitions are shown in FIG. 6, denoted by reference number 700. Each primary partition 700 is depicted with its associated numeric range (0xxx to 7xxx).

Then, at step S102, the secondary allocation procedure 304 of the handheld communications device 200 allocates the measurements that are associated with one of the primary partitions amongst numerically sequential secondary partitions. One of the measurements that is associated with the one primary partition has a desired rank. The secondary partitions are disposed numerically within the primary numerical range of the one primary partition. Each secondary partition has a respective secondary numerical range, and the value of each measurement that is associated with a secondary partition is within the respective secondary numerical range. A set of eight sample secondary partitions are shown in FIG. 6, denoted by reference number 800. In this example, all the secondary partitions 800 are disposed numerically within the numerical range (3xxx) of the fourth largest primary partition. Each secondary partition 800 is depicted with its associated numeric range (30xx to 37xx).

At step S104, the selecting procedure 306 of the handheld communications device 200 selects one of the secondary partitions in accordance with the desired rank. One of the measurements that is associated with the selected secondary partition has the desired rank.

Preferably, the measurements that are received by the primary allocation procedure 302 comprise a times-series of square amplitudes of a wireless signal received at the handheld communications device 200 via the wireless cellular network 219. Also, preferably the desired rank is 50%, and the electrical characteristic is a RSSI and comprises the root-median-square value of the strength of the received wireless signal. However, other rank measurements can be used for the RSSI. For instance, depending upon the distribution profile of the measurements or the shape of the channel filters, the desired rank might be 40% or 60%.

Further, the aforementioned method can be used to be used to provide other estimates, where the estimate requires calculating a rank of a data set. For instance, the method could be used in a general purpose computer to control an industrial process. According to this latter variation, the method receives a plurality of data values each associated with a process parameter of an industrial process. The primary allocation procedure 302 would allocate the data values amongst the primary and secondary partitions. The secondary allocation procedure 304 would allocate the data values that are associated with one of the primary partitions amongst numerically sequential secondary partitions. The selecting procedure 306 would indirectly control the industrial process by selecting one of the secondary partitions in accordance with the desired rank.

As an example of this latter variation, the data values could represent the voltage, current or impedance read by a sensor that is used in the industrial process. The general purpose computer would use the value associated with the selected secondary partition to determine whether a process parameter was within desired process limits, and then make an adjustment to the industrial process based on the value of the selected secondary partition.

As discussed above, preferably the electrical characteristic comprises the root-median-square value of the strength of a wireless signal received at the handheld communications device 200. FIG. 7 is a flow chart that depicts, in detail, the sequence of steps performed by the handheld communications device 200 when calculating the root-median-square value of the received signal strength.

Initially, at step S200, the DSP 220 of the handheld communications device 200 initializes a set of primary counters in the RAM 226. Each primary counter is referenced by a respective unique index comprising a unique primary set of binary digits. Each primary counter is uniquely associated with one of a plurality of numerically sequential virtual primary partitions. Each primary partition has a respective primary numerical range that is defined by the set of binary digits of the associated primary counter index.

As will be described below with reference to step S204, the DSP 220 generates a series of signal strength measurements of wireless signals received (received signal strength) at the handheld communications device 200. The bit length "n" of each primary counter index is less than the bit length "s" of each signal strength measurement. Further, as will be described below with reference to step S208, the DSP 220 allocates the signal strength measurements amongst the primary partitions, based on the primary numerical range associated with each primary partition. To do so, the DSP 220 correlates a subset of the most significant binary digits of each measurement with one of the primary counter binary indices. The DSP 220 uses the primary counters to count the number of signal strength measurements that are allocated to each respective primary partition.

As an example, where the length "s" of each signal strength measurement is 8 bits, and the length "n" of each primary counter index is 3 bits, the following signal strength measurements would be associated with the respective primary partitions at step S208:

| COUNTER | MEASUREMENT | | | | | | | |
|---|---|---|---|---|---|---|---|---|
| | $S_7$ | $S_6$ | $S_5$ | $S_4$ | $S_3$ | $S_2$ | $S_1$ | $S_0$ |
| $PC_7 (PC_{111})$ | 1 | 1 | 1 | X | X | X | X | X |
| $PC_6 (PC_{110})$ | 1 | 1 | 0 | X | X | X | X | X |
| $PC_5 (PC_{101})$ | 1 | 0 | 1 | X | X | X | X | X |

-continued

| COUNTER | MEASUREMENT | | | | | | | |
|---|---|---|---|---|---|---|---|---|
| | $S_7$ | $S_6$ | $S_5$ | $S_4$ | $S_3$ | $S_2$ | $S_1$ | $S_0$ |
| $PC_4$ ($PC_{100}$) | 1 | 0 | 0 | X | X | X | X | X |
| $PC_3$ ($PC_{011}$) | 0 | 1 | 1 | X | X | X | X | X |
| $PC_2$ ($PC_{010}$) | 0 | 1 | 0 | X | X | X | X | X |
| $PC_1$ ($PC_{001}$) | 0 | 0 | 1 | X | X | X | X | X |
| $PC_0$ ($PC_{000}$) | 0 | 0 | 0 | X | X | X | X | X | where:
$PC_y$ = primary counter with index y; and
$S_i$ = signal strength bit i

As shown, each signal strength measurement is correlated with one of the primary partitions based on the primary counter binary index that matches bits $S_7S_6S_5$ of the signal strength measurement. Therefore, for example, signal strength measurements in the binary range 11000000 to 11011111 are allocated to primary partition 110XXXXX. Primary counter $PC_6$ ($PC_{110}$), is used to count the number of signal strength measurements allocated to primary partition 110XXXXX. Signal strength measurements in the binary range 00100000 to 00111111 are allocated to primary partition 001XXXXX. Primary counter $PC_1$ ($PC_{001}$), is used to count the number of signal strength measurements allocated to primary partition 001XXXXX.

Returning now to step S202, preferably the BSC 402 transmits to the BTSs 404 that are connected to the BSC 402 a list of cells for the handheld communications device 200 to monitor during cell re-selection. This list typically includes the RF carrier frequencies of the radio system cell that the BTS 404 is serving, and a number of the neighbouring cells of the serving cell. Each BTS 404 transmits the cell re-selection list to the handheld communications device 200 via the wireless network 219.

At step S204, the DSP 220 of the handheld communications device 200 measures the signal strength of wireless signals received at the handheld communications device 200 via the channel filters 300. To do so, the amplitude determination procedure 302 periodically samples the amplitude of the carrier of the serving cell, and the amplitudes of the carriers of the non-serving cells indicated in the cell reselection list. Typically, the amplitude determination procedure 302 samples the amplitude of each carrier at the GSM symbol rate of 270.83 kHz. Preferably, the amplitude determination procedure 302 also computes the square of each amplitude measurement, and then passes the resulting data to the primary allocation procedure 304.

Preferably, the DSP 220 samples the carrier amplitudes in discrete time blocks of 156 samples. As a result, the primary allocation procedure 304 receives from the amplitude determination procedure 302 data sets for each cell, with each data set comprising a times-series of 156 square amplitude samples of the carrier signal for the respective cell.

At step S206, for one of the data sets, preferably the calculating procedure 310 scales the square amplitude measurements in the data set such that the maximum value of the measurements in each data set coincides with the maximum primary partition. To do so, the calculating procedure 310 calculates the mean value of all the square amplitude measurements in the data set, and then normalizes all the square amplitude measurements in the data set to a percentage of the corresponding mean value. Typically, the calculating procedure 310 normalizes the measurements to 50% of the mean.

At step S208, the primary allocation procedure 304 allocates the normalized measurements in the data set amongst the primary partitions in a manner such that the value of each normalized measurement is within the primary numerical range of the corresponding primary partition. To do so, for each measurement in the data set, the primary allocation procedure 304 examines the "x" most significant binary digits of the measurement, wherein "x" is equal to the bit length "n" of each primary counter index, and increments the primary counter whose index corresponds to the "x" most significant binary digits of the measurement.

In the foregoing example, if the binary value of a signal strength measurement is between 11000000 and 11011111 (primary partition 110XXXXX), at step S208 the primary allocation procedure 304 increments primary counter $PC_6$ ($PC_{110}$). Similarly, if the binary value of a signal strength measurement is between 00100000 and 00111111 (primary partition 001XXXXX), at step S208 the primary allocation procedure 304 increments primary counter $PC_1$ ($PC_{001}$).

At step S210, the selecting procedure 308 begins calculating the sum of the count values of each primary counter, commencing with the primary counter having the smallest index. The selecting procedure 308 continues adding to the primary count sum the count value of the primary counter having the next largest index, at step S212, until the primary count sum reaches or exceeds a desired rank.

For example, at step S210 the selecting procedure 308 sums the count values of primary counter $PC_0$ ($PC_{000}$) and primary counter $PC_1$ ($PC_{001}$). If the desired rank is 50%, and the data set includes 100 measurement samples, at step S212 the selecting procedure 308 determines whether the primary count sum is greater than or equal to the desired rank (50). If the primary count sum is less than the desired rank, processing continues at step S210 where the selecting procedure 308 adds the count value of primary counter $PC_2$ ($PC_{001}$) to the primary count sum. The selecting procedure 308 continues adding to the primary count sum the count value of the primary counter having the next largest index.

When the primary count sum reaches or exceeds the desired rank, at step S214 the selecting procedure 308 identifies the primary partition that is associated with the desired rank. To do so, at step S210 the selecting procedure 308 saves the index of the last primary counter that was added to the primary count sum at step S210. For instance, if the primary count sum exceeds the desired rank after the count value of primary counter $PC_5$ ($PC_{101}$) was added to the primary count sum, at step S210 the selecting procedure 308 would have saved the primary index value 5. The selecting procedure 308 would identify primary partition 101XXXXX, at step S214, as the primary partition that is associated with the desired rank. One of the measurements associated with the identified primary partition has the desired rank. Processing then continues at step S216.

At step S216, the DSP 220 initializes a set of secondary counters in the RAM 226. Each secondary counter is referenced by a respective unique index comprising a unique secondary set of binary digits. Each secondary counter is uniquely associated with one of a plurality of numerically sequential virtual secondary partitions. Each secondary partition has a respective secondary numerical range that is defined by the set of binary digits of the associated secondary counter index. Further, the secondary partitions are all associated with the primary partition that was identified at step S214, such that the secondary numerical ranges of the secondary partitions are disposed numerically within the primary numerical range of the identified primary partition.

Typically, the bit length "m" of each secondary counter index is less than the bit length "n" of each primary counter index. The sum of the bit length "n" and the bit length "m" is less than or equal to the bit length "s" of the signal strength measurements. Further, as will be described below with reference to step S220, for the signal strength measurements that are allocated to the identified primary partition, the DSP 220 allocates these signal strength measurements amongst the secondary partitions, based on the secondary numerical range associated with each secondary partition. To do so, the DSP 220 correlates a subset of the next most significant binary digits of each measurement with one of the secondary counter binary indices. The DSP 220 uses the secondary counters to count the number of signal strength measurements that are allocated to each respective secondary partition.

As an example, where the length "s" of each signal strength measurement is 8 bits, the length "n" of each primary counter index is 3 bits, the length "m" of each secondary counter index is 2 bits, and the DSP 220 identified primary partition 101XXXXX at step S214, the following signal strength measurements would be associated with the respective secondary partitions at step S220:

| COUNTER | MEASUREMENT | | | | | | | |
|---|---|---|---|---|---|---|---|---|
| | $S_7$ | $S_6$ | $S_5$ | $S_4$ | $S_3$ | $S_2$ | $S_1$ | $S_0$ |
| $PC_5$ ($PC_{101}$) | 1 | 0 | 1 | X | X | X | X | X |
| $SC_3$ ($SC_{11}$) | X | X | X | 1 | 1 | X | X | X |
| $SC_2$ ($SC_{10}$) | X | X | X | 1 | 0 | X | X | X |
| $SC_1$ ($SC_{01}$) | X | X | X | 0 | 1 | X | X | X |
| $SC_0$ ($SC_{00}$) | X | X | X | 0 | 0 | X | X | X | where:
$PC_y$ = primary counter with index y;
$SC_z$ = secondary counter with index z; and
$S_i$ = signal strength bit i As shown, each secondary partition is associated with primary partition 101XXXXX. Also, each signal strength measurement is correlated with one of the secondary partitions based on the secondary counter binary index that matches bits $S_4S_3$ of the signal strength measurement. Therefore, for example, signal strength measurements in the binary range 101<u>11</u>000 to 101<u>11</u>111 are allocated to secondary partition XXX11XXX. Secondary counter $SC_3$ ($SC_{11}$), is used to count the number of signal strength measurements allocated to secondary partition XXX11XXX. Signal strength measurements in the binary range 101<u>01</u>000 to 101<u>01</u>111 are allocated to secondary partition XXX01XXX. Secondary counter $SC_1$ ($SC_{01}$), is used to count the number of signal strength measurements allocated to secondary partition XXX01XXX.

After the DSP 220 initializes the secondary counters at step S216, for the normalized measurements that are associated with the primary partition identified at step S214, the secondary allocation procedure 306 allocates the normalized measurements amongst the secondary partitions in a manner such that the value of each normalized measurement is within the secondary numerical range of the corresponding secondary partition. As will be described, this allocation procedure may be a two step process (steps S218 and S220). However, these two steps can be combined into a single step.

At step S218, for each normalized measurement that was associated with a primary partition other than the primary partition that was identified at step S214, the secondary allocation procedure 306 clips those measurements to the upper and lower limits of the primary numerical range of the identified primary partition. To do so, for those measurements whose values are greater than the upper limit of the primary numerical range of the identified primary partition, the secondary allocation procedure 306 maps the set of most significant binary digits to the identified primary partition, and the set of next most significant binary digits to the maximum secondary partition. Preferably, the secondary allocation procedure 306 maps the set of most significant binary digits to the identified primary partition, and the remaining binary digits to the upper limit of the maximum secondary partition.

Similarly, for those measurements whose values are less than the lower limit of the primary numerical range of the identified primary partition, the secondary allocation procedure 306 maps the set of most significant binary digits to the identified primary partition, and the set of next most significant binary digits to the minimum secondary partition. Preferably, the secondary allocation procedure 306 maps the set of most significant binary digits to the identified primary partition, and the remaining binary digits to the lower limit of the maximum secondary partition.

As an example, where the length "s" of each signal strength measurement is 8 bits, the length "n" of each primary counter index is 3 bits, the length "m" of each secondary counter index is 2 bits, and the DSP 220 identified primary partition 101XXXXX at step S214, at step S218 the secondary allocation procedure 306 maps the signal strength measurements in primary partitions 110XXXXX and 111XXXXX to the upper limit of secondary partition XXX11XXX. In other words, for the purpose of step S220, at step S218 the secondary allocation procedure 306 treats all the signal strength measurements in primary partitions 110XXXXX and 111XXXXX as being equivalent to the value 10111111.

Similarly, at step S218 the secondary allocation procedure 306 maps the signal strength measurements in primary partitions 000XXXXX, 001XXXXX, 010XXXXX, 011XXXXX and 100XXXXX to the secondary partition XXX00XXX. In other words, for the purpose of step S220, at step S218 the secondary allocation procedure 306 treats all the signal strength measurements in primary partitions 000XXXXX, 001XXXXX, 010XXXXX, 011XXXXX and 100XXXXX as being equal to the value 10100000.

At step S220, the secondary allocation procedure 306 allocates the measurements in the resulting data set (the measurements re-mapped at step S218, and the measurements originally associated with the primary partition identified in step S214) amongst the secondary partitions in a manner such that the value of each measurement is within the secondary numerical range of the corresponding secondary partition. To do so, for each measurement in the resulting data set, the secondary allocation procedure 306 examines the "y" next most significant binary digits of the measurement, wherein "y" is equal to the bit length "m" of each secondary counter index, and increments the secondary counter whose index corresponds to the "y" next most significant binary digits of the measurement.

In the foregoing example, if the binary value of a signal strength measurement is between 10111000 and 10111111 (secondary partition XXX11XXX), at step S220 the secondary allocation procedure 306 increments secondary counter $SC_3$ ($SC_{11}$). Similarly, if the binary value of a signal strength measurement is between 10101000 and 10101111 (secondary partition XXX01XXX), at step S220 the secondary allocation procedure 306 increments secondary counter $SC_1$ ($SC_{01}$).

At step S222, the selecting procedure 308 begins calculating the sum of the count values of each secondary counter, commencing with the secondary counter having the smallest index. The selecting procedure 308 continues adding to the secondary count sum the count value of the secondary counter having the next largest index, at step S224, until the secondary count sum reaches or exceeds a desired rank.

For example, if the desired rank is 50%, and the data set includes 100 measurement samples, at step S222 the secondary allocation procedure 306 sums the count values of secondary counter $SC_0$ ($SC_{00}$) and secondary counter $SC_1$ ($SC_{01}$). At step S224, the selecting procedure 308 determines whether the secondary count sum is greater than or equal to the desired rank (50). If not, processing continues at step S222 where the selecting procedure 308 adds the count value of secondary counter $SC_2$ ($SC_{10}$) to the secondary count sum. The selecting procedure 308 continues adding to the secondary count sum the count value of the secondary counter having the next largest index.

When the secondary count sum reaches or exceeds the desired rank, at step S226 the selecting procedure 308 identifies the secondary partition that is associated with the desired rank. To do so, at step S222 the selecting procedure 308 saves the index of the last secondary counter that was added to the secondary count sum at step S222. For instance, if the secondary count sum exceeds the desired rank after the count value of secondary counter $SC_2$ ($SC_{10}$) was added to the secondary count sum, at step S222 the selecting procedure 308 would have saved the secondary index value 2. The selecting procedure 308 would identify secondary partition XXX10XXX, at step S226, as the secondary partition that is associated with the desired rank. Processing then continues at step S228.

At the completion of step S226, one of the measurements associated with the identified secondary partition has the desired rank. Therefore, at step S228, the calculating procedure 310 identifies the measurement having the desired rank by computing the binary value that is uniquely associated with the primary partition identified at step S214 and the secondary partition identified at step S226. To do so, the calculating procedure 310 logically combines the primary counter index that is associated with the identified primary partition and the secondary counter index that is associated with the identified secondary partition.

In this computation, the primary counter index occupies the most significant bit locations of the combined binary index value, and the secondary counter index occupies the next most significant bit locations of the combined binary index value. For example, if the selecting procedure 308 identified primary partition 101XXXXX at step S214, and identified secondary partition XXX10XXX at step S226, the calculating procedure 310 would compute the combined binary index value, at step S228, by tacking on the binary value 10 to the right of the binary value 101. Preferably, the remaining significant bits would be zeroed, so that the combined binary index value would be 10110000.

At step S230, the calculating procedure 310 de-scales the combined binary index value in the converse manner to scaling step S206. For example, if the calculating procedure 310 normalized all the square amplitude measurements in the data set to a percentage of the mean value at step S206, the calculating procedure 310 de-normalizes the combined binary index value by the same percentage of the mean value at step S230.

Since the measurements that are received by the primary allocation procedure 302 comprise a times-series of square amplitudes, the de-scaled binary value calculated at step S230 is the square of the measurement having the desired rank value. Therefore, at step S232, the calculating procedure 310 calculates the square root of the de-scaled binary value. The resulting binary value is the measurement having the desired rank value.

Although the invention described herein is more computationally expensive than a mean computation, the invention is less computationally expensive than conventional median (or other rank) computations. For instance, whereas conventional median value computations are typically ORD(n log n), the invention described herein is ORD(n). Further, the root-median-square computation, described herein, is less sensitive to spectral coloration and contamination than RMS computations.

Further, it should be understood that, although the invention was described above as a two-step rank computation process, the invention is not so limited. For instance, since the resolution of the measurement having the desired rank value is limited by the number of bits that are used to represent the combined binary index value, the rank determination process could be extended to more than two steps. In the C source code listing shown below, multiple sets of sub-partitions are defined, with each set of sub-partitions being within one of the parent partitions, and the process iterating until the desired resolution is obtained.

```
#include <stdio.h>
#include <string.h>
#define BITS_PER_PASS       5
#define NUMBER_OF_PASSES    3
#define NUMBER_OF_BINS      (1 << BITS_PER_PASS);
#define BIN_BITMASK         (NUMBER_OF_BINS - 1);
static int ScaleArray( unsigned int *data, int numElements );
// The ScaleArray function scales the array elements by a common factor and returns the
// number of bits the elements have been shifted to the left. Scaling here is done
// in powers of 2, to potentially exploit normalize operations in DSPs, but can
// also use a general ratio in other implementations.
static unsigned int FastMedian( unsigned int *data, int numElements )
{
    unsigned char bins[NUMBER_OF_BINS];
    int i, sum, x, shift, scale;
    unsigned int median, mask;
    // Scale (normalize) array elements to left
    scale = ScaleArray( data, numElements );
    shift = 32 - BITS_PER_PASS;
    mask = 0xFFFF FFFF >> BITS_PER_PASS;
    // Clear bins
    memset( bins, 0, sizeof(bins) );
    // Build first histogram
    for ( i = 0; i < numElements; i++ )
```

-continued

```
            bins[data[i] >> shift] += 1; // consider only 5 most significant bits
    // Find first bin
    sum = 0;
    for ( median = 0; median < NUMBER_OF_BINS; median++ )
    {
        sum += bins[median];
        if ( sum >= numElements/2 )
            break; // bins[median] contains median
    }
    for ( x = 0; x < (NUMBER_OF_PASSES - 1); x++ )
    {
        unsigned int min, max, m;
        min = ( median << shift );          // min = smallest number in bin selected in
                                             previous iteration
        max = ( median << shift ) | mask;   // max = largest number in bin
                                             selected in previous iteration
        shift -= BITS_PER_PASS;
        mask >>= BITS_PER_PASS;
        memset( bins, 0, sizeof(bins) );
        // Build histogram
        for ( i = 0; i < numElements; i++ )
        {
            // Do max and min
            unsigned int val = data[i];
            val = max < val ? max : val;    // if val > max, map to upper limit of
                                             selected bin
            val = min > val ? min : val;    // if val < min, map to lower limit of
                                             selected bin
            bins[(val >> shift) &BIN_BITMASK] += 1;   // consider next 5
                                                      most significant bits
        }
        // Find bin
        sum = 0;
        for ( m = 0; m < NUMBER_OF_BINS; m++ )
        {
            sum += bins[m];
            if ( sum >= numElements/2 )
                break; // bins[m] contains median
        }
        median = ( median << BITS_PER_PASS ) | m;    // tack on next most
                                                      significant bits to median
    }
    // Zero out remaining least significant bits and then de-normalize the result
    return ( median << shift ) >> scale;
}
```

Figure 8:
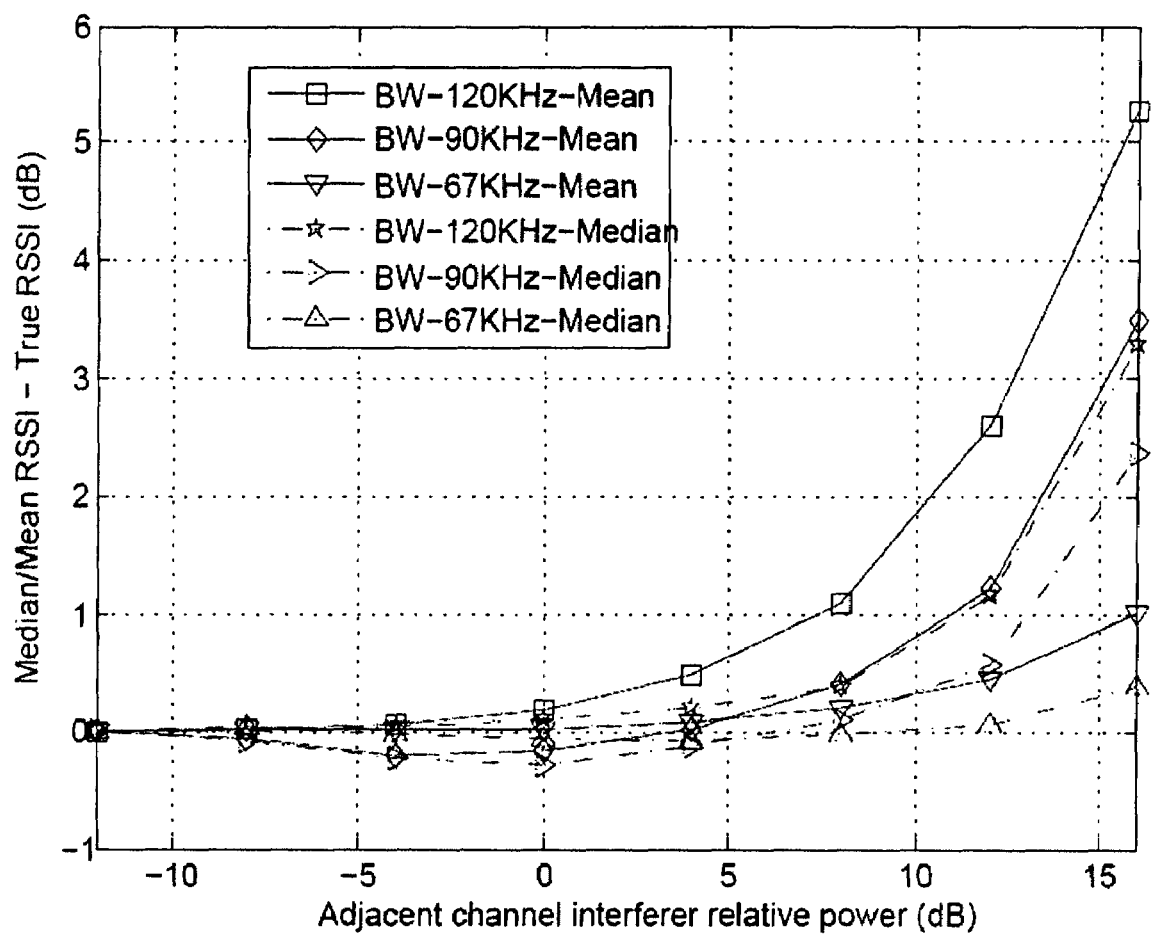
FIG. 8 depicts the variation in mean RSSI and median RSSI (as determined by the method), against true RSSI, for selected channel filter bandwidths.

FIG. 8 depicts the variation in mean RSSI and median RSSI (as determined by the foregoing method), against true RSSI, for selected channel filter bandwidths. In this example, wanted signal and adjacent channel interferer are both GMSK. These experimental results show that median RSSI is more invariant than mean RSSI as channel filter bandwidth and interference level change. Further, for a given channel filter bandwidth, the adjacent channel interference level can be 3 to 5 dB stronger before median RSSI deviates from true RSSI, in comparison to mean RSSI. As a result, the foregoing method, when applied to the power estimation of a signal, is less sensitive to channel filter shape, channel interference, and noise than traditional RMS.

The scope of the monopoly desired for the invention is defined by the claims appended hereto, with the foregoing description being merely illustrative of the preferred embodiment of the invention. Persons of ordinary skill may envisage modifications to the described embodiment which, although not explicitly suggested herein, do not depart from the scope of the invention, as defined by the appended claims.

We claim:

1. A method of estimating a characteristic of an electrical signal, comprising the steps of:

allocating a plurality of measurements amongst numerically sequential primary partitions, each said measurement being associated with a characteristic of an electrical signal, each said primary partition having a respective primary numerical range, a value of each said measurement being numerically within one of the primary numerical ranges;

allocating the measurements associated with one of the primary partitions amongst numerically sequential secondary partitions, one of the measurements associated with the one primary partition having a desired rank, the secondary partitions being disposed numerically within the primary numerical range of the one primary partition, each said secondary partition having a respective secondary numerical range, the value of each said measurement associated with each said secondary partition being within a respective one of the secondary numerical ranges; and estimating the characteristic by selecting one of the secondary partitions in accordance with the desired rank, one of the measurements associated with the selected one secondary partition having the desired rank.

2. The method according to claim 1, wherein each said measurement comprises a set of binary digits having a word length, each said primary partition comprises a unique primary set of binary digits of primary length less than the word length, each said unique primary set of binary digits is uniquely associated with a respective primary counter, and the step of allocating the measurements amongst the primary partitions comprises, for each said measurement, incrementing the primary counter corresponding to a set of most significant binary digits of the measurement.

3. The method according to claim 2, wherein each said secondary partition comprises a unique secondary set of binary digits of secondary length, each said unique secondary set of binary digits is uniquely associated with a respective secondary counter, and the step of allocating the measurements amongst the secondary partitions comprises, for each said measurement associated with the one primary partition, incrementing the secondary counter corresponding to a set of next most significant binary digits of the measurement.

4. The method according to claim 3, wherein the step of allocating the measurements amongst the secondary partitions further comprises clipping the measurements associated with other than the one primary partition to upper and lower limits of the primary numerical range of the one primary partition.

5. The method according to claim 4, wherein the clipping step comprises the steps of, for the measurements whose values are greater than the upper limit, mapping the set of next most significant binary digits to a maximum one of the secondary partitions, and for the measurements whose values are less than the lower limit, mapping the set of next most significant binary digits to a minimum one of the secondary partitions.

6. The method according to claim 4, further comprising, prior to the step of allocating the measurements amongst the primary partitions, scaling the values of the measurements such that a maximum one of the values in the plurality of measurements coincides with a maximum one of the primary partitions.

7. The method according to claim 3, further comprising the steps of, prior to the step of allocating the measurements amongst the primary partitions, calculating a mean of the values of the plurality of measurements, and normalizing the values of the plurality of measurements to a percentage of the mean.

8. The method according to claim 3, further comprising calculating a square root of a combined value of the primary set of binary digits of the one primary partition and the secondary set of binary digits of the selected one secondary partition, and the plurality of measurements comprising a times-series of square amplitudes of the electrical signal.

9. The method according to claim 8, wherein each said square amplitude comprises a square of the strength of a wireless signal received at an electronic communications device.

10. A wireless communications device comprising:
primary allocation means for allocating a plurality of measurements amongst numerically sequential primary partitions, each said measurement being associated with a characteristic of an electrical signal received at the communications device, each said primary partition having a respective primary numerical range, a value of each said measurement being numerically within one of the primary numerical ranges;
secondary allocation means for allocating the measurements associated with one of the primary partitions amongst numerically sequential secondary partitions, the secondary allocation means being coupled to the primary allocation means, one of the measurements associated with the one primary partition having a desired rank, the secondary partitions being disposed numerically within the primary numerical range of the one primary partition, each said secondary partition having a respective secondary numerical range, the value of each said measurement associated with each said secondary partition being within a respective one of the secondary numerical ranges; and
selecting means for selecting one of the secondary partitions in accordance with the desired rank, the selecting means being coupled to the secondary allocation means, one of the measurements associated with the selected one secondary partition having the desired rank.

11. The wireless communications device according to claim 10, wherein each said measurement comprises a set of binary digits having a word length, each said primary partition comprises a unique primary set of binary digits of primary length less than the word length, the wireless communications device includes a respective primary counter uniquely associated with each said unique primary set of binary digits, and the primary allocation means is configured to, for each said measurement, increment the primary counter corresponding to a set of most significant binary digits of the measurement.

12. The wireless communications device according to claim 11, wherein each said secondary partition comprises a unique secondary set of binary digits of secondary length, the wireless communications device includes a respective secondary counter uniquely associated with each said unique secondary set of binary digits, and the secondary allocation means is configured to, for each said measurement associated with the one primary partition, increment the secondary counter corresponding to a set of next most significant binary digits of the measurement.

13. The wireless communications device according to claim 12, wherein the secondary allocation means is configured to allocate the measurements amongst the secondary partitions by clipping the measurements associated with other than the one primary partition to upper and lower limits of the primary numerical range of the one primary partition.

14. The wireless communications device according to claim 13, wherein the secondary allocation means is configured to clip the measurements by, for the measurements whose values are greater than the upper limit, mapping the set of next most significant binary digits to a maximum one of the secondary partitions, and for the measurements whose values are less than the lower limit, mapping the set of next most significant binary digits to a minimum one of the secondary partitions.

15. The wireless communications device according to claim 13, further comprising calculating means configured to scale the values of the measurements such that a maximum one of the values in the plurality of measurements coincides with a maximum one of the primary partitions, the calculating means being coupled to an input of the primary allocation means.

16. The wireless communications device according to claim 12, further comprising calculating means configured to calculate a mean of the values of the plurality of measurements, and to normalize the values of the plurality of measurements to a percentage of the mean, the calculating means being coupled to an input of the primary allocation means.

17. The wireless communications device according to claim 12, further comprising calculating means configured to calculate a square root of a combined value of the primary set of binary digits of the one primary partition and the secondary set of binary digits of the selected one secondary partition, the calculating means being coupled to an output of the selecting means, and the plurality of measurements comprises a times-series of square amplitudes of the electrical signal.

18. The wireless communications device according to claim 17, wherein each said square amplitude comprises a square of the strength of a wireless signal received at the wireless communications device, the communications device further comprising signal strength measuring means configured to determine the square of the strength of the received wireless signal.

19. A computer readable medium carrying processing instructions for an electronic communications device, the processing instructions, when executed by a computer processor of the communications device, enabling the wireless communication device to perform the steps of:

allocating a plurality of measurements amongst numerically sequential primary partitions, each said measurement being associated with a characteristic of an electrical signal received at the communications device, each said primary partition having a respective primary numerical range, a value of each said measurement being numerically within one of the primary numerical ranges;

allocating the measurements associated with one of the primary partitions amongst numerically sequential secondary partitions, one of the measurements associated with the one primary partition having a desired rank, the secondary partitions being disposed numerically within the primary numerical range of the one primary partition, each said secondary partition having a respective secondary numerical range, the value of each said measurement associated with each said secondary partition being within a respective one of the secondary numerical ranges; and selecting one of the secondary partitions in accordance with the desired rank, one of the measurements associated with the selected one secondary partition having the desired rank.

20. A method of controlling an industrial process, comprising the steps of:

allocating a plurality of data values amongst numerically sequential primary partitions, each said data value being associated with a process parameter of an industrial process, each said primary partition having a respective primary numerical range, each said data value being numerically within one of the primary numerical ranges;

allocating the data values associated with one of the primary partitions amongst numerically sequential secondary partitions, one of the data values associated with the one primary partition having a desired rank, the secondary partitions being disposed numerically within the primary numerical range of the one primary partition, each said secondary partition having a respective secondary numerical range, the data values associated with each said secondary partition being within a respective one of the secondary numerical ranges; and controlling the industrial process by selecting one of the secondary partitions in accordance with the desired rank, one of the data values associated with the selected one secondary partition having the desired rank.

21. A method of estimating a characteristic of an electrical signal in a handheld computing device, comprising:

while receiving, in real time, a plurality of measurements of the characteristic of the electrical signal, estimating the characteristic by, at the handheld computing device, repeatedly allocating the measurements amongst a hierarchical multi-level partition space until a desired resolution of the measurement associated with a desired rank is attained, each level of the partition space having a plurality of partitions, each partition having a respective numerical range, one of the partitions in each partition level encompassing the numerical range of all the partitions in the partition level immediately lower thereto, a value of each said allocated measurement being within a respective one of the numerical ranges, the numerical range of one of the partitions comprising the desired rank resolution.

* * * * *